(12) United States Patent
Yonts

(10) Patent No.: US 6,417,855 B1
(45) Date of Patent: Jul. 9, 2002

(54) SYSTEM AND METHOD FOR UTILIZING THRESHOLDS DURING A DYNAMIC DISPLAY OF DATA RELATIONSHIPS BETWEEN STATIC CHARTS

(75) Inventor: Richard Yonts, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/322,061

(22) Filed: May 27, 1999

(51) Int. Cl.[7] .............................................. G06T 11/20
(52) U.S. Cl. ................. 345/473; 345/440.1; 345/440.2; 345/629; 345/736
(58) Field of Search ................................ 345/440, 441, 345/112, 113, 121, 133, 140, 520, 522, 523, 4, 5, 10, 11, 30, 35, 418, 619, 629, 630, 440.1, 440.2, 722–723, 736; 364/551.01, 300; 709/106; 717/6; 702/186

(56) References Cited

U.S. PATENT DOCUMENTS

| | | | |
|---|---|---|---|
| 4,877,404 A | 10/1989 | Warren et al. | |
| 4,885,684 A | * 12/1989 | Austin | 364/300 |
| 5,210,712 A | * 5/1993 | Saito | 364/825 |
| 5,339,392 A | 8/1994 | Risberg et al. | |
| 5,375,201 A | 12/1994 | Davoust | 395/161 |
| 5,483,468 A | * 1/1996 | Chen | 364/551.01 |
| 5,510,809 A | * 4/1996 | Sakai | 345/133 |
| 5,513,306 A | 4/1996 | Mills et al. | 395/148 |
| 5,515,490 A | 5/1996 | Buchanan et al. | |
| 5,581,677 A | 12/1996 | Myers et al. | 395/140 |
| 5,581,678 A | 12/1996 | Kahn | 395/140 |
| 5,619,631 A | 4/1997 | Schott | 395/140 |
| 5,721,815 A | 2/1998 | Ottesen et al. | 395/200.09 |
| 5,721,878 A | 2/1998 | Ottesen et al. | |
| 5,739,823 A | * 4/1998 | Akaza | 345/440 |
| 5,751,883 A | 5/1998 | Ottesen et al. | 386/27 |
| 5,844,572 A | * 12/1998 | Schott | 345/440 |
| 5,999,162 A | * 12/1999 | Takahashi | 345/121 |
| 6,097,399 A | * 8/2000 | Bhatt | 345/130 |
| 6,266,067 B1 | * 7/2001 | Owen et al. | 345/473 |

OTHER PUBLICATIONS

"MacUser—The Mac's premier business-charting program. . . " http://www.deltapoint.com/dgpro/dg10003.htm.

"SpaceCharts—Java-based 3-Dimensional Charting Package," http://www.infospace-inc.com/docs/webchart/datacht-t.htm.

* cited by examiner

Primary Examiner—Matthew Luu
Assistant Examiner—Wessner Sajous
(74) Attorney, Agent, or Firm—Sawyer Law Group LLP

(57) ABSTRACT

Method and system aspects for utilizing thresholds during the display of dynamically displayed charts are described. The aspects include obtaining data from first and second static charts and setting a value criteria. Data from the first static chart is displayed as a beginning chart, and the displayed data is adjusted from the first static chart to visually indicate a change in the data required by the data from the second static chart as an ending chart. The aspects further include comparing the value criteria to the displayed data, and halting the displaying of the data when the value criteria has been met.

20 Claims, 4 Drawing Sheets

SYSTEM AND METHOD FOR UTILIZING THRESHOLDS DURING A DYNAMIC DISPLAY OF DATA RELATIONSHIPS BETWEEN STATIC CHARTS

RELATED APPLICATIONS

The present application is related to co-pending U.S. patent application Ser. No. 09/123,716, entitled SYSTEM AND METHOD FOR DYNAMICALLY DISPLAYING DATA RELATIONSHIPS BETWEEN STATIC CHARTS, and assigned to the assignee of the present invention.

FIELD OF THE INVENTION

The present invention relates to dynamic presentations of static chart displays, and more particularly, to utilizing thresholds during dynamic presentations of static chart displays.

BACKGROUND OF THE INVENTION

The abundance of information generated in today's computer world is ever-increasing. Databases and spreadsheet programs assist in storing and entering data in a variety of categories. Data analysis typically utilizes some form of graphical displays of stored data. Most graphical displays represent either discrete time intervals, or a summary of chosen data from multiple time intervals.

Charts of discrete time intervals are, by nature, mere snapshots of data. These chart displays of historical data are thus difficult to view and understand in order to see trends in the data. Further, a series of related charts that display similar data but vary by some criterion, e.g., days, are tedious to view, especially when there are large numbers of charts. When related charts are displayed together, e.g., across a desktop display of a computer system, identifying the correlation among the charts is difficult, and even when viewed separately but consecutively, such as in a slide show, the display is normally choppy and difficult to control. Thus, viewers are required to remember information from each static chart/display over a large number of charts. Such requirements result in a less intuitive method of display. Summary displays are somewhat more intuitive than individual static displays. However, as summary charts, they do not usually provide the level of detail that individual static charts provide.

A need exists for establishing thresholds for customizing how the chart data is viewed and for assisting in interpreting trends during chart analysis. The present invention addresses such a need.

SUMMARY OF THE INVENTION

The present invention provides method and system aspects for utilizing thresholds during the display of dynamically displayed charts. The aspects include obtaining data from first and second static charts and setting a value criteria. Data from the first static chart is displayed as a beginning chart, and the displayed data is adjusted from the first static chart to visually indicate a change in the data required by the data from the second static chart as an ending chart. The aspects further include comparing the value criteria to the displayed data, and halting the displaying of the data when the value criteria has been met.

The present invention provides a beneficial, meaningful way to adjust the display of data variations among related, static charts to achieve more flexibility during displayed data transitioning. Through progressive displaying of intermediate charts, the impression of continuity and an intuitive understanding of chart relationships are given. With the use of low or high threshold values for controlling the display by establishing a potential stop point during the display, better approximation of a distance between the charts is displayed, giving the user a more precise indication of the time at which the data crossed the threshold value. These and other advantages of the aspects of the present invention will be more fully understood in conjunction with the following detailed description and accompanying drawings.

DETAILED DESCRIPTION OF THE INVENTION

The present invention relates to utilizing thresholds to control the dynamic presentation of data relationships between static charts. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
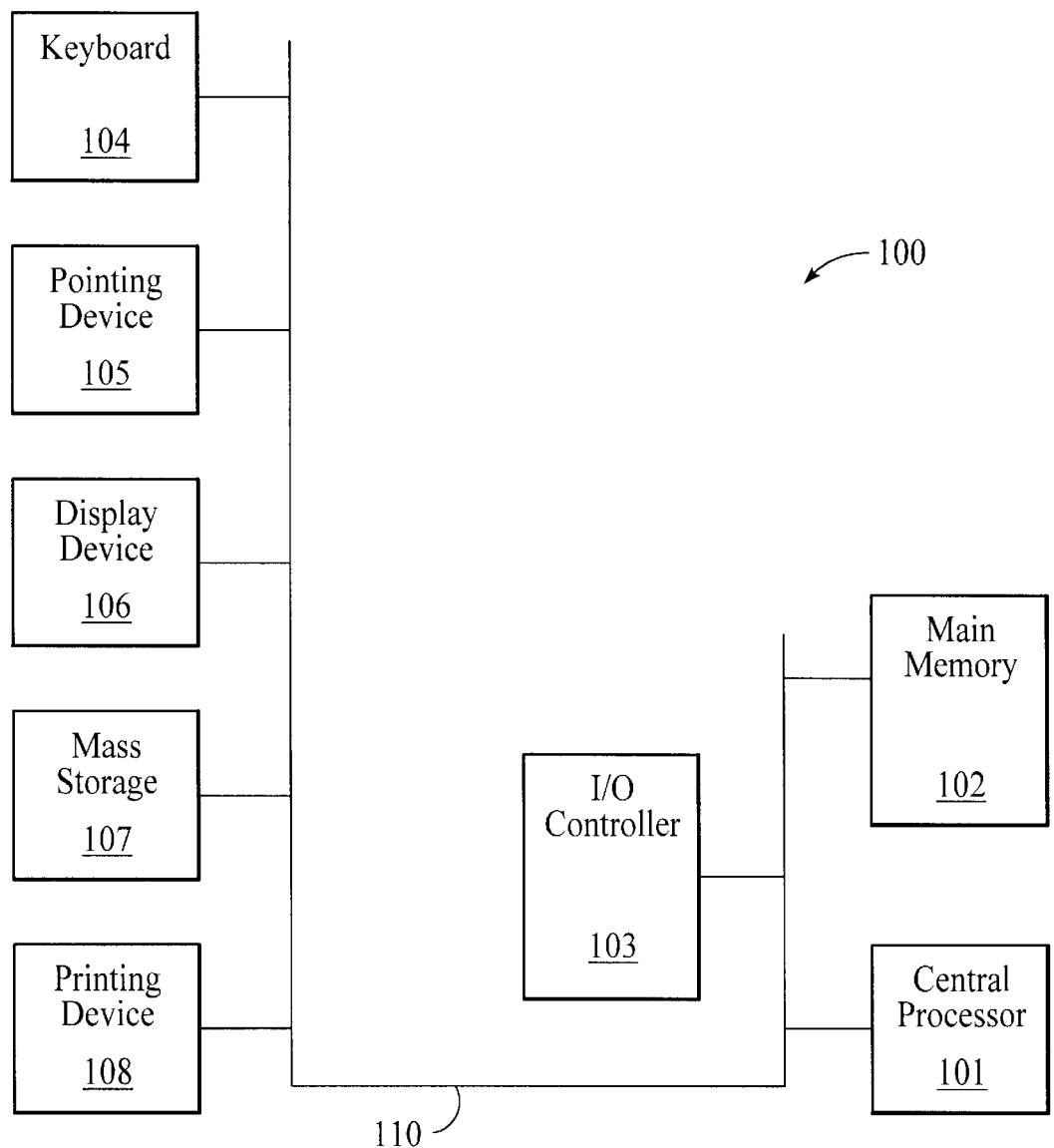
FIG. 1 illustrates a computer system suitable for embodying the present invention.

The present invention is suitably embodied in a computer system such as system 100 shown in FIG. 1 which includes: a central processor 101; a main memory 102; an input/output controller 103; a keyboard 104; a pointing device 105 (e.g., a mouse, trackball, pen device, or the like); a display device 106; and a mass storage device 107 (e.g., a hard disk). Additional input/output devices, such as a printing device 108, may be included in the system 100 as desired. As shown, the various components of system 100 communicate through a system bus 110 or similar architecture. The system 100 suitably represents an IBM-compatible personal computer system, available from a variety of vendors, including IBM Corporation, Armonk, N.Y. System 100 operates in accordance with an operating system and one or more application programs, as is well understood by those skilled in the art.

Figure 2:
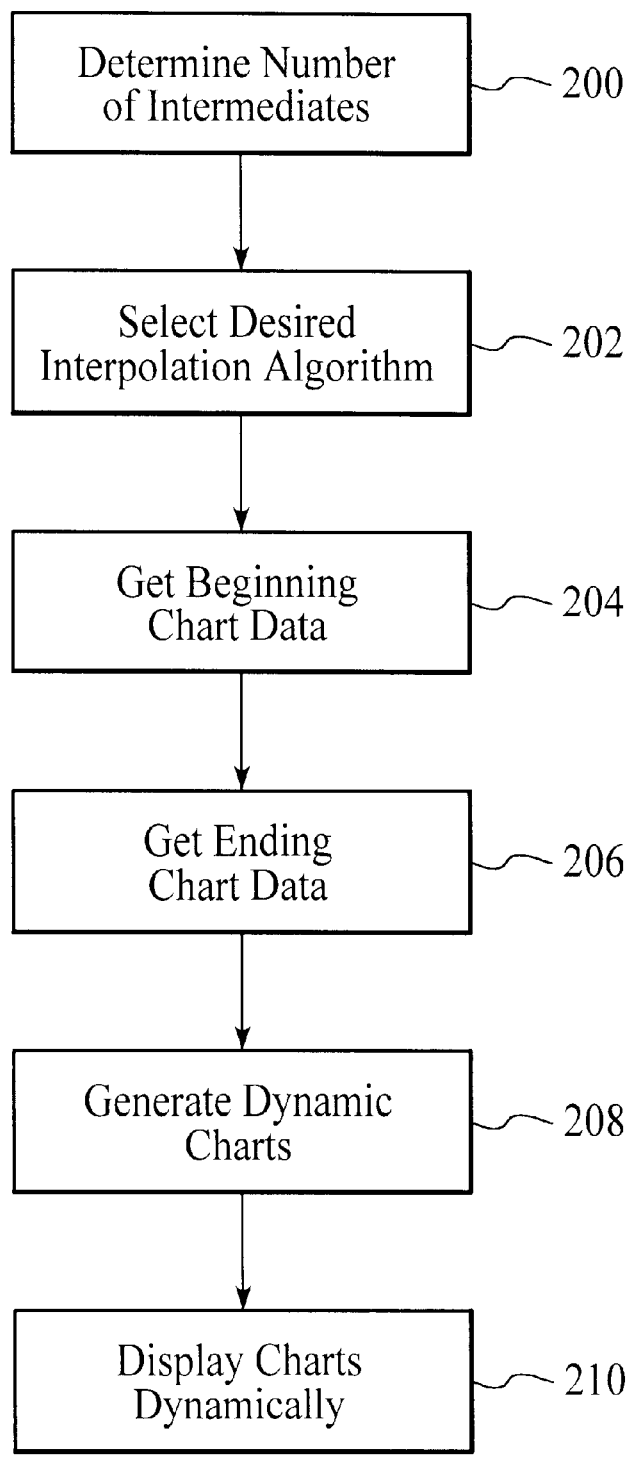
FIG. 2 illustrates a flow diagram of a process for generating dynamic charts.

In the present invention, generation of dynamic charts from static data charts provides more intuitive presentation of trends exhibited by the static charts. A flow diagram of a preferred process of generating dynamic charts via a suitable programming routine from a computer readable medium is described with reference to FIG. 2, while FIGS. 3*a*, 3*b*, 3*c*, 3*d*, and 3*e* illustrate an example of successive charts that would provide a dynamic transition from an initial static chart (FIG. 3*a*) to an ending static chart (FIG. 3*e*). It should be appreciated that FIG. 2 illustrates one embodiment of a sequence of steps. This is meant to be illustrative of a preferred embodiment. Other sequences may be utilized to achieve the dynamic chart presentation in accordance with the present invention in which data is obtained from static charts with the display of the data from a first chart adjusted to visually indicate a change in the data required by a second chart, as described in more detail hereinbelow.

With reference to FIG. 2, a general algorithm initiates with a determination of a number of intermediate points that are to be used in generating the dynamic charts (step 200). For example, thirty points has been found to work well by the inventors, but the number chosen is design dependent, e.g., dependent upon the desired smoothness of transition, as well as the processing capabilities of a given system. For the example shown in FIGS. 3a–3e, the number of intermediate points is four. The process then continues with a selection of a desired interpolation algorithm for interpolating between points (step 202), for example, a linear interpolation algorithm. Preferably, the actual method of interpolation is selectable, either by multi-selection logic or using object-oriented technology, as is well understood by those skilled in the art. It should be appreciated, however, that while the selection of a desired algorithm allows greater flexibility in customizing how transitions occur between the intermediate points, the desired manner of performing the transition between points can be programmed directly, thus making the selection step unnecessary in such processes.

Once the number of points and interpolation algorithm are chosen, the data stored in memory, e.g., from a spreadsheet program, database, or the like in storage 107, is retrieved for the beginning static chart (step 204) and the ending static chart (step 206). Suitably, the charts have similar data in a consistent display (e.g., similar axes, scales, titles, footnotes, etc.). Based on the interpolation algorithm and number of points between the beginning and ending static charts, the intermediate charts are generated (step 208). The dynamic display then occurs (step 210) by displaying the intermediate charts successively from the beginning chart through to the ending chart. Thus, the beginning chart is displayed and overlaid by an initial intermediate chart at a specified interval avoiding flicker/visual distraction, with the overlay repeated for each next intermediate chart until the ending static chart is displayed. For a group of static charts that has more than two static charts, e.g., monthly static charts from an initial static chart of January through a final static chart of December, the ending chart of each set of two charts suitably becomes the beginning chart for a next set of two charts, and the process is repeated until all the static charts in the group have been displayed.

To make the display smooth, preferably the well-known graphics techniques of tweening and morphing are employed, where tweening suitably refers to a technique where intermediate views are created by algorithmic interpolation of points, objects pictures, etc., between a starting display and an ending display. Usually, the view is mathematically the half point between the two displays. Tweens represent static views between other static views. Morphing suitably refers to a technique where one view is gradually changed from the initial view into the target view by some technique. Usually, morphing applies to graphics (pictures) and is a dynamic process. Morphing may use tweening to determine its intermediate states but is not limited to such a technique.

In general, pseudo-code for the process of steps 204, 206, 208, and 210 illustrated in FIG. 2 is described by:

```
FOR count=1 TO number_charts-1
    generate n intermediate_charts between chart[count]
        and
        chart[count+1]
    display static chart[count]
    FOR index=1 TO intermediate_steps
        wait specified interval
        display intermediate_chart[index]
    END
END
wait specified time interval
display static chart[number_charts]
```

In generating the intermediate charts, the chart data is suitably represented as a matrix, e.g., a two-dimensional matrix. The following describes generation of intermediate charts in terms of pseudo-code for a two-dimensional matrix.

```
BEGIN
    FOR i=1 TO shape_dimension_1
    FOR j=1 TO shape_dimension_2
        intermediate_chart[i,j]=
            Interpolate_data(first_chart[i,j],
                last_chart[i,j],
                index)
    END
    END
    return intermediate_chart
END
```

Pseudo-code for the Interpolate_data is suitably described by:

```
BEGIN
    return ((second_datum—first_datum)/
        (intermediate_steps+1)×index)
END
```

Figure 3A:
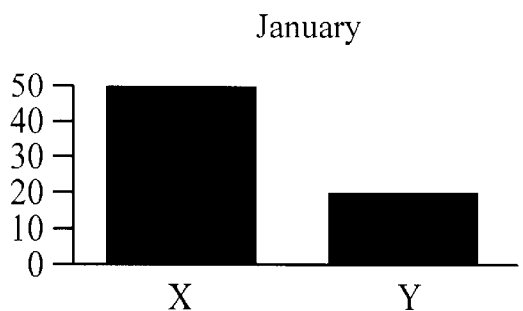
FIGS. 3a, 3b, 3c, 3d, and 3e illustrate an example of successive charts for dynamic transitioning between two static charts.
Figure 3B:
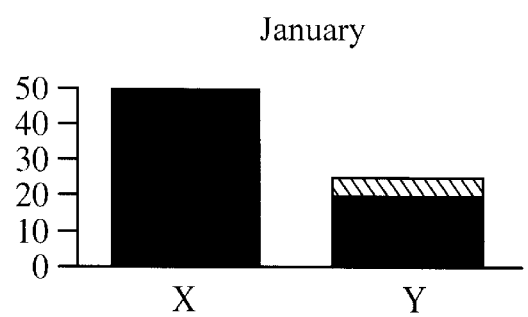
Figure 3C:
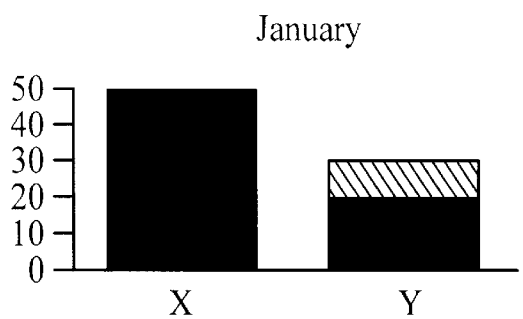
Figure 3D:
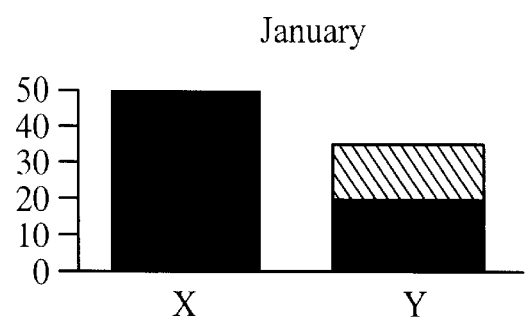
Figure 3E:
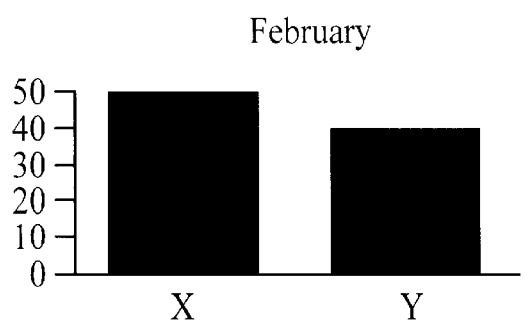

As an example with four intermediate steps between a beginning and ending static chart, FIG. 3a illustrates an initial static chart where two categories, 'X' and 'Y', are plotted, while FIG. 3e illustrates a final static chart for categories 'X' and 'Y'. In the example, the initial value for category 'Y' is 20 (FIG. 3a), and the final value for category 'Y' is 40 (FIG. 3e). Category 'X' remains unchanged. With a difference of twenty between the initial and final values of category 'Y' and a chosen number of four intermediate steps, a linear interpolation of the data results in a change of five units per intermediate step. Thus, FIG. 3b illustrates a change from twenty to twenty-five in category 'Y', FIG. 3c illustrates a change from twenty-five to thirty, FIG. 3d illustrates a changes from thirty to thirty-five, and FIG. 3e illustrates the final change from thirty-five to forty, with the change in value demonstrated by the dashed areas in the FIGS. 3b, 3c, and 3d. Of course, the dashing is meant to more distinctively represent the effect of the interpolated steps in the figures, but these dashed areas would not be displayed as such in an actual display. While it is difficult to fully represent the dynamic nature of a display from the initial static chart of FIG. 3a to the final static chart of FIG. 3e through sequential figures, when the charts of FIGS. 3a–3e are displayed, one overlaying the previous, an animated view is created in which the value of 'Y' grows from 20 to 40.

Thus, a relationship between static charts for all related information is more effectively presented. Dynamic charts display the information on one view by progressively overlaying older views with newer ones. Data can be interpolated between actual points by any numerical method preferred.

Further control of the display of these charts through the establishment and utilization of threshold values gives control over how the charts are viewed. In general, in the present invention, before dynamic charts are being displayed, thresholds are set for specific values. The display of the dynamic charts is stopped at the first static or intermediate chart that has a value that violates the thresholds. A threshold, either high or low, is set for any value, a certain series value or a certain category value, where a category refers to a major grouping along the x-axis (i.e., a first index [i] within the data matrix), and a series refers to a minor grouping of a category (i.e., a second index [j] within the data matrix). High thresholds refer to those values that are larger than the maximum desired data, and when the data is equal to or greater than the high threshold, the dynamic display stops. Low thresholds refer to those values that are smaller than the minimum desired data, and when the data is equal to or less than the low threshold, the dynamic display stops. For example, in the dynamic display representation of FIGS. 3a–3e, the value of category 'Y' changes from 20 to 40. If a high threshold value of 30 were set prior to the displaying, the dynamic display would be controlled to stop when the value of 30 were reached/exceeded. Thus, the dynamic display would halt at the intermediate chart of FIG. 3c.

In order to provide for the utilization of thresholds to control the dynamic display of charts, the previously presented pseudo-code is altered. Prior to the point of beginning the computation for intermediate charts, the thresholds are preferably set, such as through their selection via a GUI (graphical user interface) dialog that specifies a high or low threshold. In a preferred embodiment, either a high or a low threshold may be set, but not both. Further, either a high or low threshold may be disabled to allow the chart values to remain untested for their display.

Implementation of the threshold value checking introduces additional steps in the previously presented pseudo-code at the point where the 'wait specified interval' is executed. The pseudo-code is suitably modified as follows:

```
FOR count=beginning_chart TO ending_chart
    generate n intermediate_charts between chart[count]
    and
        chart[count+1]
    display static chart[count]
    FOR index=1 TO intermediate_steps
        IF either_high_threshold_enabled==TRUE
            IF high_threshold_category_enabled==TRUE
                start_i=high_threshold_category_number
                end_i=high_threshold_category_number
            ELSE
                start_i=1
                end_i=shape_dimension_1
            ENDIF
            IF high_threshold_series_enabled==TRUE
                start_j=high_threshold_series_number
                end_j=high_threshold_series_number
            ELSE
                start_j=1
                end_j=shape_dimension_2
            ENDIF
        ELSEIF either_low_threshold_enabled==TRUE
            IF low_threshold_category_enabled==TRUE
                start_i=low_threshold_category_number
                end_i=low_threshold_category_number
            ELSE
                start_i=1
                end_i=shape_dimension_1
            ENDIF
            IF low_threshold_series_enabled==TRUE
                start_j=low_threshold_series_number
                end_j=low_threshold_series_number
            ELSE
                start_j=1
                end_j=shape_dimension_2
            ENDIF
        ELSE
            start_i=1
            end_i=shape_dimension_1
            start_j=1
            end_j=shape_dimension_2
        ENDIF
        FOR i=start_i to end_i
            FOR j=start_j to end_j
                IF intermediate_chart[i,j]<=low_threshold_value
                OR
                    intermediate_chart[i,j]>=high_threshold_value
                    Generate_control_event(STOP)
                    BREAK/*exit for both FOR loops*/
            END
        END
        SWITCH (control_event)
            FOR index=first_step TO last_step
                SWITCH (control_event)
                    CASE stop
                        delay=infinite
                END
                display intermediate_chart[index]
            END
        END
        wait delay
    display static chart[number_charts]
```

Figure 4:
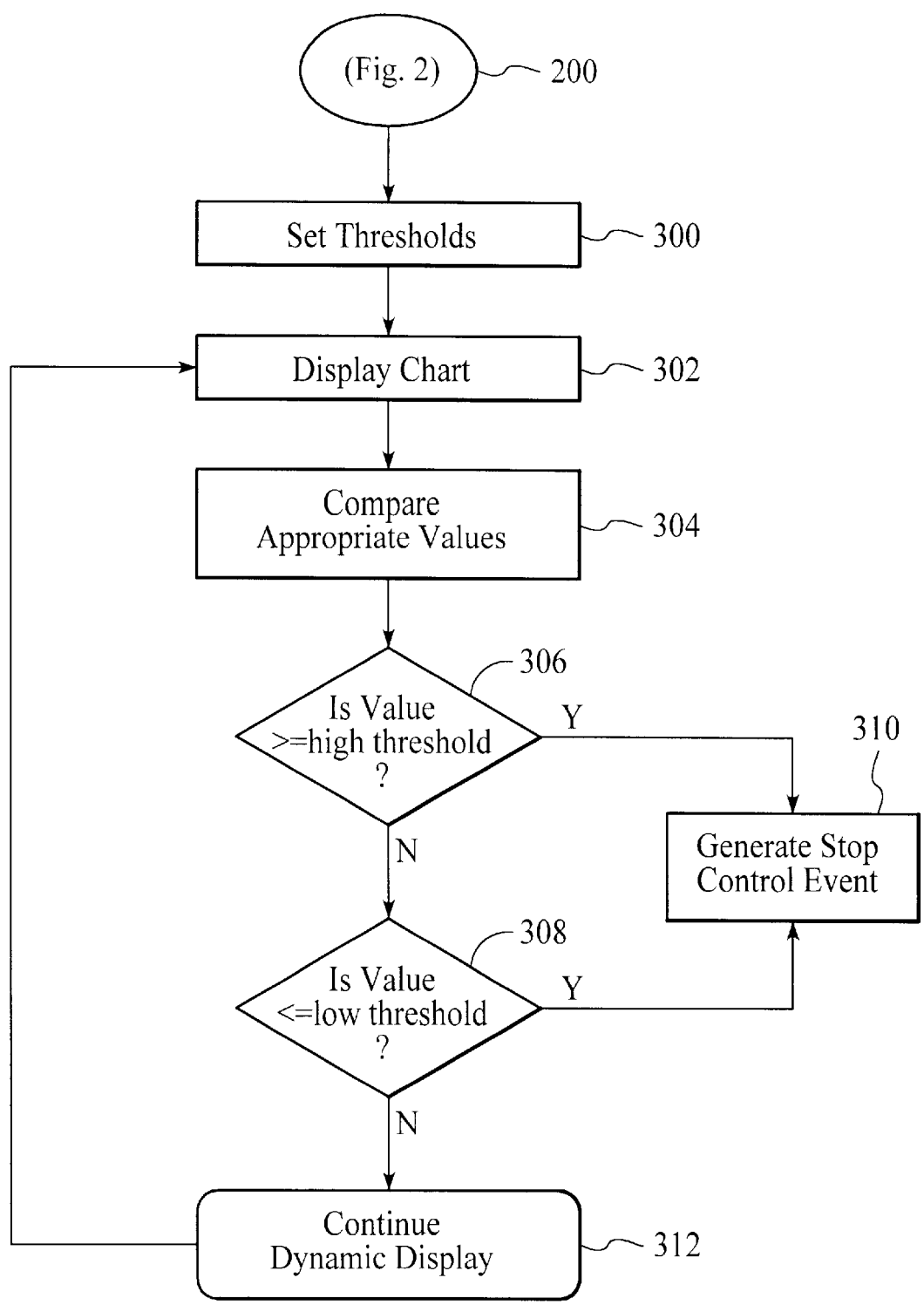
FIG. 4 illustrates a block diagram for utilizing thresholds to control the dynamic display of data in accordance with the present invention.

FIG. 4 illustrates a flow diagram representing the utilization of thresholds during the generation and display of dynamic charts (i.e., step 208 and 210 of FIG. 2). Referring to FIG. 4, the utilization includes setting the thresholds (step 300), e.g., via a GUI. The display of chart(s) then occurs (step 302) which causes the threshold value to be compared with the appropriate value in the current chart data (step 304). Thus, a determination of whether the data is greater than or equal to a high threshold value is made (step 306). If not greater than or equal to a high threshold value, a determination is made as to whether the data is less than or equal to a low threshold value (step 308). If a specific category or specific series threshold is set, only the values specific to the selected category or series are checked to determine if any value has gone outside of the acceptable range. When the threshold value criteria has been met (i.e., either step 306 or 308 is affirmative) and the value does fall outside of the desired range, a stop control event is generated (step 310) to halt the dynamic display. When the data does not meet the criteria, the dynamic display continues (step 312), so that the threshold is continued to be checked during the dynamic display.

The halting of the display suitably occurs via generation of a stop control event that alters the display speed of the charts, with a delay range set to infinite for the stop control event. It should be appreciated that other control events may be utilized during the dynamic display of charts that enhance the control of the display to allow users to alter the display to be faster or slower and in a forward or reverse direction. The details of the addition of these control events to the dynamic display are described in co-pending U.S. patent application, Ser. No. 09/323,164, entitled System and Method for Controlling a Dynamic Display of Data Relationships between Static Charts, assigned to the assignee of the present invention, and incorporated by reference herein in its entirety.

Through the present invention, the ability to utilize threshold values and provide control of dynamic displays of static chart data is achieved. Through this control, greater convenience results, as users are able to more quickly analyze data relative to desired maximum or minimum values in comparison to the data provided by the static charts as the static charts are dynamically displayed.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for utilizing thresholds during the display of dynamically displayed charts, the method comprising:

obtaining data from first and second static charts;

setting a value criteria;

displaying data from the first static chart as a beginning chart;

adjusting the displayed data from the first static chart to visually indicate a change in the data required by the data from the second static chart as an ending chart;

comparing the value criteria to the displayed data to determine whether to halt the display; and halting the displaying of the data when the value criteria has been met.

2. The method of claim 1 wherein setting the value criteria further comprises setting a maximum value threshold.

3. The method of claim 2 wherein the maximum value threshold further comprises maximum category threshold.

4. The method of claim 2 wherein the maximum threshold further comprises a maximum series threshold.

5. The method of claim 1 wherein setting the value criteria further comprises setting a minimum threshold.

6. The method of claim 5 wherein the minimum value threshold further comprises minimum category threshold.

7. The method of claim 5 wherein the minimum value threshold further comprises a minimum series threshold.

8. The method of claim 1 wherein adjusting further comprises determining a number of steps desired between the first and second static charts, selecting an interpolation algorithm to process changes in data between the first and second static charts, generating intermediate charts from the obtained data wherein the number of steps desired determines a number of intermediate charts generated, and displaying the intermediate charts through overlaying of one intermediate chart over another to visually indicate the change in data between the intermediate charts.

9. The method of claim 8 wherein halting the displaying of data further comprises generating a stop control event to halt the displaying of the data at the intermediate chart that meets the value criteria.

10. The method of claim 9 wherein generating a stop control event further comprises adjusting the display with an infinite delay interval.

11. A system for utilizing thresholds during a dynamic display of static chart data, the system comprising:

memory storage for storing data from at least two static charts;

a display for displaying the stored data; and a processor coupled to the display and to the memory storage for supporting a process of obtaining data from first and second static charts stored in the memory, setting a value criteria, displaying the data from the first static chart as a beginning chart on the display, adjusting the displayed data from the first static chart to visually indicate a change in the data required by the data from the second static chart to display as an ending chart, comparing the value criteria to the displayed data to determine whether to halt the display, and halting the displaying when the value criteria has been met.

12. The system of claim 11 wherein adjusting further comprises determining a number of steps desired between the first and second static charts, selecting an interpolation algorithm to process changes in data between the first and second static charts, generating intermediate charts from the obtained data wherein the number of steps desired determines a number of intermediate charts generated, and displaying the intermediate charts through overlaying of one intermediate chart over another in the direction and with a preset delay interval to visually indicate the change in data between the intermediate charts.

13. The system of claim 12 wherein halting further comprises generating a stop control event.

14. The system of claim 13 wherein a stop control event further comprises adjusting the display with an infinite delay interval.

15. The system of claim 11 wherein the value criteria further comprises a category having a maximum value or minimum value threshold.

16. The system of claim 11 wherein the value criteria further comprises a series having a maximum value or minimum value threshold.

17. A method for utilizing thresholds during a dynamic display of data between two static charts, the method comprising:

determining a number of intermediate charts between first and second static charts;

retrieving data for the first static chart;

retrieving data for the second static chart;

setting a threshold value;

generating the number of intermediate charts;

displaying the first static chart; and overlaying the display with each generated intermediate chart by determining that the generated intermediate chart does not violate the threshold value to control the dynamic display of the data from the first static chart to the second static chart by not halting the dynamic display.

18. The method of claim 17 wherein when the generated intermediate chart does violate that threshold value, the method further comprises generating a stop control event.

19. The method of claim 18 wherein generating a stop control event establishes an infinite delay to halt the dynamic display.

20. The method of claim 17 wherein setting a threshold value further comprises setting a limit for a range of values for one of the group consisting of a category and a series value.

* * * * *